US008903994B2

(12) United States Patent
Kramnik et al.

(10) Patent No.: US 8,903,994 B2
(45) Date of Patent: Dec. 2, 2014

(54) READ-THROTTLED INPUT/OUTPUT SCHEDULER

(75) Inventors: Alexander Kramnik, Chicago, IL (US);
Nicolaus P. Matnick, Chicago, IL (US);
William Lyle Hayhurst, Chicago, IL (US)

(73) Assignee: DRW Technologies LLC, Chicago, IL (US)

( * ) Notice: Subject to any disclaimer, the term of this patent is extended or adjusted under 35 U.S.C. 154(b) by 333 days.

(21) Appl. No.: 13/506,006

(22) Filed: Mar. 20, 2012

(65) Prior Publication Data

US 2013/0254324 A1 Sep. 26, 2013

(51) Int. Cl.
*G06F 15/173* (2006.01)
*G06F 12/02* (2006.01)
*H04L 12/863* (2013.01)

(52) U.S. Cl.
CPC ............. *G06F 12/0246* (2013.01); *H04L 47/50* (2013.01)
USPC .......................................................... 709/224

(58) Field of Classification Search
CPC ............ G06F 12/0246; G06F 11/1068; G06F 15/167; G06F 15/17; H04L 47/10; H04L 47/50
USPC ................ 709/204–207, 213–219, 223–226, 709/238–249; 710/29, 40–41, 52–57
See application file for complete search history.

(56) References Cited

U.S. PATENT DOCUMENTS

| 5,548,728 | A * | 8/1996 | Danknick | 709/213 |
|---|---|---|---|---|
| 2004/0133714 | A1* | 7/2004 | Haren | 710/52 |
| 2006/0233108 | A1* | 10/2006 | Krishnan | 370/235 |
| 2008/0133893 | A1* | 6/2008 | Glew | 712/220 |
| 2012/0066435 | A1* | 3/2012 | Colgrove et al. | 711/103 |
| 2012/0203969 | A1* | 8/2012 | Daly et al. | 711/122 |
| 2012/0290684 | A1* | 11/2012 | Elliott et al. | 709/217 |
| 2013/0117624 | A1* | 5/2013 | Nicolas et al. | 714/755 |
| 2014/0032825 | A1* | 1/2014 | Jeddeloh | 711/103 |

FOREIGN PATENT DOCUMENTS

WO WO 2012113511 A1 * 8/2012

* cited by examiner

*Primary Examiner* — Dustin Nguyen
*Assistant Examiner* — Michael A Keller
(74) *Attorney, Agent, or Firm* — Paul E Schaafsma; NovusIP, LLC

(57) ABSTRACT

In accordance with the principles of the present invention, read throttled input/output scheduler applications and methods are provided. A read-throttling input/output scheduler takes write requests for data captured from a network, provides this data to a system that persists the captured data, and takes read requests from external user systems. The rate of read and write requests is determined by maintaining two sliding windows over previous write requests, with the second window being longer then the first. The read-throttling input/output scheduler is configured such that, when write requests activity exceeds a threshold as determined over the first window, the read-throttling input/output scheduler throttles the flow of read requests. A storage medium is provided onto which the read and write requests are forwarded. This Abstract is submitted with the understanding that it will not be used to interpret or limit the scope or meaning of the claims.

23 Claims, 4 Drawing Sheets

READ-THROTTLED INPUT/OUTPUT SCHEDULER

FIELD OF THE INVENTION

The present invention relates the electronic processing of data.

BACKGROUND OF THE INVENTION

With the proliferation of processing power and electronic communication bandwidth, an explosion of data is being generated and transmitted by a multitude of sources. This data is collected and stored for analysis for a wide variety of applications. One such area where this has seen particular explosive growth is in electronic trading of financial products.

At one time, there were only open-outcry exchanges where brokers and traders, or more specifically buyers and sellers, would come together to trade in person. More recently, electronic exchanges that process automatic and electronic matching of bids and offers have been introduced. Thus, trading methods have evolved from a manually intensive process to a technology enabled, electronic platform.

Electronic trading is generally based on centralized (host) computers, one or more computer networks, and exchange participant (client) computers. In general, the host exchange includes one or more centralized computers. The operations of the host exchange typically include order matching, maintaining order books and positions, price information, and managing and updating the database for the trading day as well as nightly batch runs. The host exchange also is equipped with external interfaces that maintain contact with quote vendors and other price information systems.

Using client devices, market participants link to the host exchange through one or more networks. A network is a group of two or more computers or devices linked together. There are many types of wired and wireless networks, such as for example local area networks and wide area networks. Networks can also be characterized by topology, protocol, and architecture. For example, some market participants may link to the host through a direct connection such as an Integrated Services Digital Network (ISDN) or T1. Some participants link to the host exchange through direct connections and through other common network components such as high-speed servers, routers, and gateways. There are many different types of networks and combinations of network types that can link traders to the host exchange. The Internet can be used to establish a connection between the client device and the host exchange.

The Internet is a global network of computers. Network servers support hypertext capabilities that permit the Internet to link together webs of documents. User interfaces such as Graphical User Interfaces (GUI) are typically used to navigate the Internet to retrieve relevant documents. Uniform Resource Locators (URLs) are used to identify specific web sites and web pages on the Internet. URLs also identify the address of the document to be retrieved from a network server.

To transmit digitized information in a reliable way, the Internet uses a packet-switching design. Packet switching breaks up blocks of digitized information into smaller pieces called packets. These packets are transmitted through the network, usually by different routes, and are then reassembled at their destination. See, e.g., Len Kleinrock, "Information Flow in Large Communications Nets", RLE Quarterly Progress Report (1960); Len Kleinrock, Communication Nets (1964). See also Paul Baren, "On Distributed Communications Networks", IEEE Transactions on Systems (March 1964).

The original packet switching employed by the Internet was referred to as the Transmission Control Protocol/Internet Protocol (TCP/IP). The Transmission Control Protocol (TCP) packetizes information and reassembles the information upon arrival. The Internet Protocol (IP) routes packets by encasing the packets between networks. See, e.g., Robert Kahn and Vincent Cerf, "A Protocol for Packet Network Intercommunication", IEEE Transactions on Communications Technology (May 1974). There are many additional protocols used for relaying Internet traffic.

More recent packet switching employed by the Internet includes the User Datagram Protocol/Internet Protocol (UDP/IP). Host exchanges frequently transmit information about the trading market to client devices using the UDP/IP protocol. UDP/IP uses a simple transmission model without implicit handshaking dialogues for providing reliability, ordering or data integrity. UDP provides an unreliable service and datagrams may arrive out of order, appear duplicated or go missing without notice; thus, UDP assumes that error checking and correction is either not necessary or performed in the application, avoiding the overhead of such processing at the network interface level. Time-sensitive applications often use UDP because dropping packets is preferable to waiting for delayed packets, which may not be an option in a real-time system. There are many other communication protocols TCP/IP and UDP/IP that can be used to transit or receive data over a network.

TCP/IP and UDP/IP are examples of the communication protocols that can be classified by the Open Systems Interconnection (OSI) model. The OSI model is a prescription of characterizing and standardizing the functions of a communication system in terms of layers. Similar communication functions are grouped into logical layers, with a layer serving the layer above it, and being served by the layer below it. The lowest layer of the OSI model is the Physical Layer, also known as "Layer 1", and commonly abbreviated to "PHY". The physical layer defines the electrical and physical specifications between a computer device and a transmission medium, such as copper or optical fiber cable. Examples of physical layers include DSL, ISDN, Ethernet physical layer (10BASE-T, 10BASE2, 100BASE-TX, 1000BASE-T, and other varieties), Infiniband, T1, and the like.

Above the physical layer is the data link layer, also known as "Layer 2". The data link layer provides the functional and procedural means to transfer data between network entities and detect and correct errors that may occur in the physical layer. Examples of data link layers include ARP, ATM, Ethernet, Frame Relay, 802.11, Infiniband, Token Ring, and the like. For both TCP/IP and UDP/IP, the data link layer is responsible for encapsulation of IP packets into frames, frame synchronization, error detection and handling, and addressing via media access control (MAC), among others.

Above the data link layer is the network layer, also known as 'Layer 3'. This layer is concerned with actually getting data from one computer to another, even if the computer is remote or on different network. Functions of the network layer include connectionless communication, host addressing, and messaging forwarding. Example network layer protocols include IPv4 and IPv6, ICMP, IGMP, PIM-SM and PIM-DM, Infiniband, IPX, and the like. For both TCP/IP and UDP/IP, the Internet Protocol, or "IP", is the Layer 3 implementation used to route packets through one or many networks.

Above the network layer is the transport layer, also known as 'Layer 4'. The transport layer provides end-to-end communication services such as connection-oriented data stream support, reliability, flow control, congestion avoidance, byte orientation, and multiplexing. Examples of transport layers include TCP, UDP, RDP, IL, Infiniband, ATP, and the like.

The Internet is an example of an implementation of the OSI model. There are many other examples of networks, including personal networks, local area networks, home networks, storage area networks, campus networks, backbone networks, metropolitan area networks, wide area networks, virtual private networks, and the like. Usage, trust level, and access rights differ between these different types of networks.

A subset of data collection problems deals with data generated from a variety of sources, and transmitted at a very high rate on a computer network using a communication protocol such as for example UDP/IP. Any solution that captures and persists this data for use is subject to some basic requirements. Persists refers to the characteristic of configurations of information in a program or machine that outlives the process that created it. Without persistence, this information would only exist in random access memory (RAM), and would be lost when this RAM loses power, such as a computer shutdown. Persistence is achieved in practice by storing the information as data in non-volatile storage such as a hard drive or flash memory.

First, the persisted must be a one-for-one snapshot of all of the data that was broadcasted from the source. If data is transmitted, but not persisted, this is known as a 'gap' or a 'drop'. Many categories of usage break down if the persisted data contains gaps. Since transmitted data is usually not repeatable, the data capture solution must guarantee that all transmitted packets will be captured and persisted.

Second, under normal network load conditions, users must be able to access persisted data even as new transmitted data is being captured and persisted. Inability to access persisted data would handicap many business processes because the business processes will be unable to respond to changing conditions in their environment. For example, the act of detecting and responding to packet loss in a network would be severely hampered if the network administrator were unable to access the persisted network data until the end of the business day. User access has the potential to interrupt the process of persisting data, as the two activities are both contending for the same finite set of computer resources. This potential becomes more likely as network traffic load increases. As network load increases towards capture and persistence capacity, existing systems will allow capture rate to degrade as a result of increased user access, leading to data gaps.

Existing systems that attempt to solve this problem share a common design. The typical approach is to use a hardware device referred to as a passive network tap that provides a way to access data flowing across a computer network. The passive network tap duplicates a stream of packets and routes the stream of packets to a network communication protocol capture card installed in a packet capture appliance. The network communication protocol capture card hands incoming packets to a process on the system, which persists them to a storage medium. The typical system implementation uses a computer running an operating system and a magnetic or flash disk drive for storage.

Existing systems manage the reading and writing of information on storage through a straightforward algorithmic process. Read refers to a user accessing stored information while write refers to storing the information. One example is 'round robin', where a scheduler selects a read or write pointed to by a counter from a list, after which the counter is incremented and if the end is reached, the scheduler returns to the beginning of the list. Another example is 'first-in-first-out', where a scheduler stores read and writes in a queue, with the first read or write to be added to the queue the first read or write to be acted upon, with processing proceeds sequentially in the same order.

The ability of existing solutions to meet the criteria outlined above rests with ensuring a high and consistent rate of persisting (writing) incoming data to the storage medium under conditions of load consisting of both transmission persistence and user access. Under typical loads consisting of mixtures of read and write requests, storage media exhibit a high variability in the latency of individual write requests and a lower overall total performance. For magnetic media, this is due to the seek-time latency as the read-write heads traverse between the storage cylinders. For flash media, this is to what has been termed the 'bathtub effect': high numbers for pure reads and writes but much lower ones for mixed workloads.

This variability in the effective write performance of the storage medium degrades the ability to maintain a high and consistent write performance. This in turn creates backpressure on the rest of the system. If this backpressure reaches the network communication protocol capture card, the card has no choice but to drop incoming packets due to internal memory buffer overflow. This happens because a capture solution is passive in nature, meaning that the presence of the capture solution on the network is unknown to other network devices. As a result, the system cannot request that packets be retransmitted if the network communication protocol capture card cannot keep up with the packet rate.

Existing solutions use a number of mechanisms to attempt to prevent this 'backpressure' (the build up of data that occurs when buffers are full and incapable of receiving more data) from reaching the network communication protocol capture card. Such mechanisms use a region of memory—either on the card itself, inside the process or inside the operating system (known as the page cache)—to create one or more buffers between the network communication protocol, capture card, and the storage medium. While these mechanisms can smooth out the variability in the write performance of the storage medium, when all the buffers fill the backpressure inevitably reaches the network communication protocol capture card, forcing it to drop packets. Such mechanisms also have the disadvantage of taking memory resources away from the rest of the system.

SUMMARY OF THE INVENTION

In accordance with the principles of the present invention, read throttled input/output scheduler applications and methods are provided. A read-throttling input/output scheduler takes write requests for data captured from a network, provides this data to a system that persists the captured data, and takes read requests from external user systems. The rate of read and write requests is determined by maintaining two sliding windows over previous write requests, with the second window being longer then the first. The read-throttling input/output scheduler is configured such that, when write requests activity exceeds a threshold as determined over the first window, the read-throttling input/output scheduler throttles the flow of read requests. A storage medium is provided onto which the read and write requests are forwarded.

This Summary introduces concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF A PREFERRED EMBODIMENT

Under typical loads consisting of mixtures of read and write requests, storage media exhibit a high variability in the latency of individual write requests and a lower overall total performance. Existing solutions a region of memory to create one or more buffers between the network communication protocol, capture card and the storage medium. When all the buffers fill, however, the backpressure inevitably reaches the network communication protocol capture card, forcing it to drop packets. Such mechanisms also have the disadvantage of taking memory resources away from the rest of the system. The present invention all but eliminates the variability of the storage medium. This in turn reduces the possibility of exerting backpressure on the network communication protocol capture card and forcing it to drop packets.

In accordance with the principles of the present invention, read throttled input/output scheduler applications and methods are provided. In accordance with the principles of the present invention, read throttled input/output scheduler applications and methods are provided. A read-throttling input/output scheduler takes write requests for data captured from a network, provides this data to a system that persists the captured data, and takes read requests from external user systems. The rate of read and write requests is determined by maintaining two sliding windows over previous write requests, with the second window being longer then the first. The read-throttling input/output scheduler is configured such that, when write requests activity exceeds a threshold as determined over the first window, the read-throttling input/output scheduler throttles the flow of read requests. A storage medium is provided onto which the read and write requests are forwarded.

Figure 1:
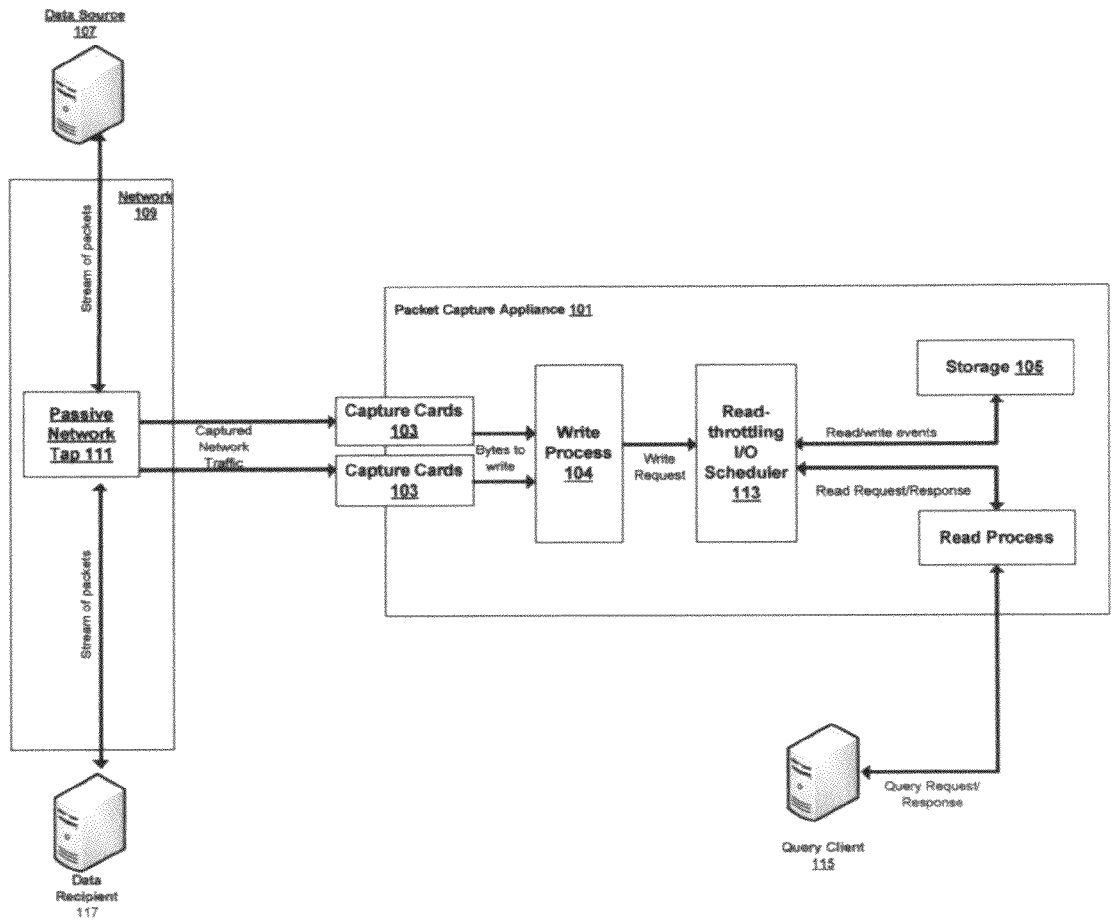
FIG. 1 is a conceptual drawing showing a high-level system overview using passive network taps.

In more detail, referring to FIG. 1 a conceptual drawing showing a high-level system overview is seen. A packet capture appliance 101 is provided. The packet capture appliance 101 can comprise a computer running a derivative of the LINUX® operating system. The LINUX® computer-operating system is an open-source operating system that is available under a general-public license administered by The Linux Foundation, 1796 18th Street, Suite C, San Francisco, Calif. 94107.

At least one network communication protocol capture card 103 for capturing packets is provided. The network communication protocol capture card 103 can be the DAG® card available from Endace USA Limited, 14425 Penrose Place, Suite 225, Chantilly, Va. 20151. A storage medium 105, such as for example a magnetic or flash disk drive is provided for storage, possibly organized in a redundant array of independent disks (RAID) configuration to increase the baseline performance and reliability.

Multiple data sources, represented by data source 107, generate and disseminate data over a network 109, such as for example the Internet. A passive network tap 111 is provided to access data flowing across the network 109. The passive network tap 111 can be a Gigamon network tap available from Gigamon, 598 Gibraltar Drive, Milpitas, Calif. 95035. The passive network tap 111 duplicates a stream of packets and routes the stream of packets to the network communication protocol capture card 103. The network communication protocol capture card 103 hands incoming packets to a write process 104 on the appliance, which writes them to a storage medium 105 via the read-throttling I/O scheduler 113. This data may then be queried by a query client 115. In parallel, the network traffic is consumed by the original recipient of the packet stream, data recipient 117.

Figure 2:
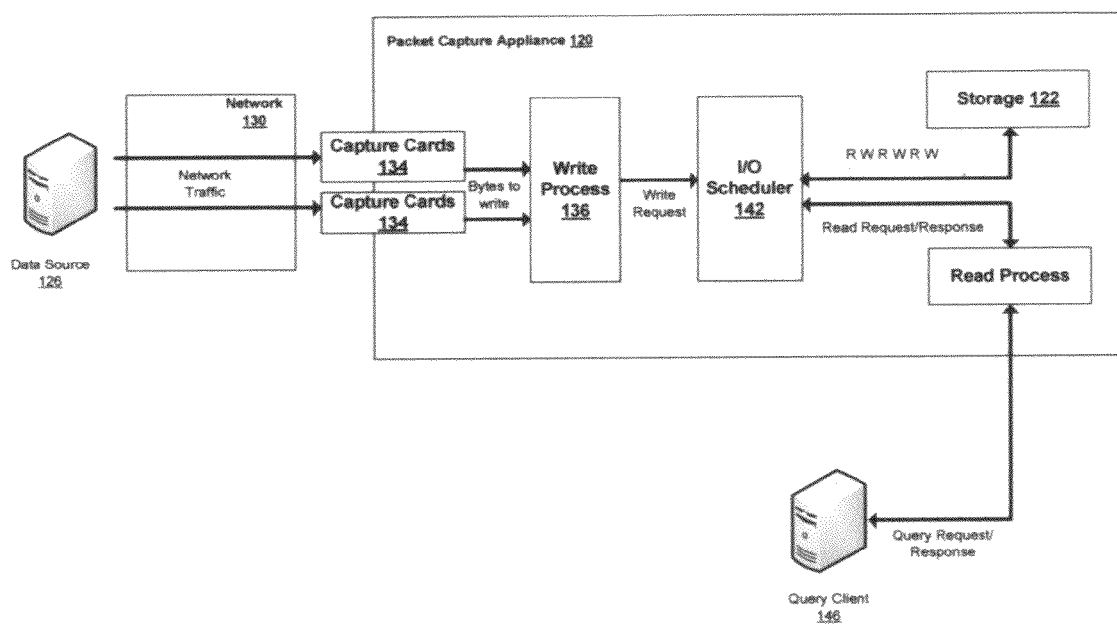
FIG. 2 is a conceptual drawing showing a high-level system overview without using passive network taps.

The present invention applies regardless of how the transmitted network data is provided to the read-throttling input/output scheduler. Referring to FIG. 2, a conceptual drawing showing a high-level overview without a passive network tap is seen. A packet capture appliance 120 is provided. The packet capture appliance 120 can comprise a computer running a derivative of the LINUX® operating system. The LINUX® computer-operating system is an open-source operating system that is available under a general-public license administered by The Linux Foundation, 1796 18th Street, Suite C, San Francisco, Calif. 94107.

At least one network communication protocol capture card 122 for capturing packets is provided. The network communication protocol capture card 122 can be the DAG® card available from Endace USA Limited, 14425 Penrose Place, Suite 225, Chantilly, Va. 20151. A storage medium 122, such as for example a magnetic or flash disk drive is provided for storage, possibly organized in a redundant array of independent disks (RAID) configuration to increase the baseline performance and reliability.

Multiple data sources, represented by data source 126, generate and disseminate data over a network 130, such as for example the Internet. The network communication protocol capture card 134 hands incoming packets to a write process 136 on the appliance, which writes them to a storage medium 122 via the read-throttling I/O scheduler 142. This data may then be queried by a query client 146.

Figure 3:
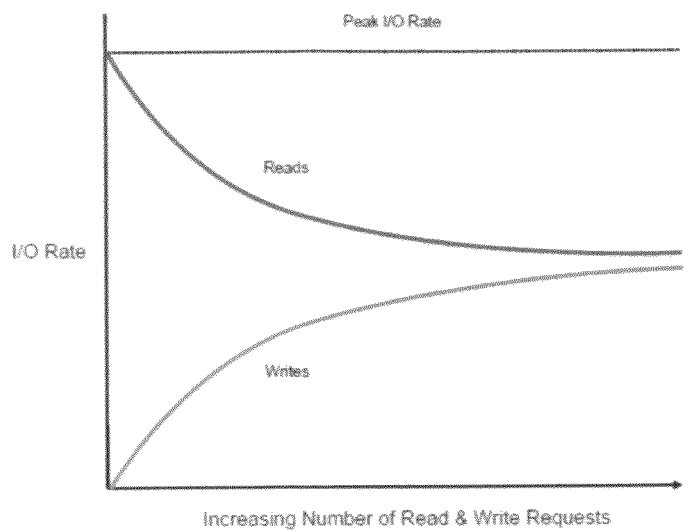
FIG. 3 is a graph illustrating what happens to the read and write rates as capture rate goes up under a typical prior art scheduler.

Referring to FIG. 3, a chart illustrating what happens to the read and write rates as capture rate goes up under a typical prior art scheduler is seen. The X-axis displays the input/output (I/O) rate while the Y-axis represents time. A storage device can write continuously at its peak rate if the storage device is serving only write requests. The peak performance starts to fall off as soon as read requests are introduced, with the rate of falloff increasing as the ratio of read requests to write requests increases. This ratio is directly correlated positively to the variability of any individual write request and correlated negatively to the write performance.

When the write performance falls below the rate of data capture, the storage device starts generating backpressure, causing any existing buffers to fill up. If the difference between the write rate and capture rate is high enough, the buffers will fill up completely and the backpressure will ultimately reach the network communication protocol capture card, forcing it to drop packets. For convenience, this difference can be non-limitedly referred to as the throttling threshold. This throttling threshold can be a static, predetermined level or can be determined in a dynamic, non-predetermined fashion.

Referring back to FIG. 1, a read-throttling input/output (I/O) scheduler 113 is provided. The read-throttling I/O scheduler 113 is tied to the throttling threshold. The read-throttling I/O scheduler 113 can be a module of the operating system kernel through which read requests from a read process 115 and write requests from a write process 117 pass en route to the storage media 105. The read-throttling I/O scheduler 113 is at liberty to let read and write requests pass in any order the read-throttling I/O scheduler 113 desires.

As the volatility of read requests from the read process 115 and write requests from the write process 117 can be quite high, particularly if the level is at or near the threshold. In order to prevent hysteresis, some form of averaging scheme is advisable. Hysteresis is a condition where the scheduler undesirably oscillates between throttling and non-throttling modes.

In one embodiment, the capture rate is monitored by maintaining two sliding windows over previous write requests, with the second window being longer then the first. For convenience, the first window can be non-limitedly referred to as the ramp-up window, while the second window can be non-limitedly referred to as the back-off window.

Figure 5:
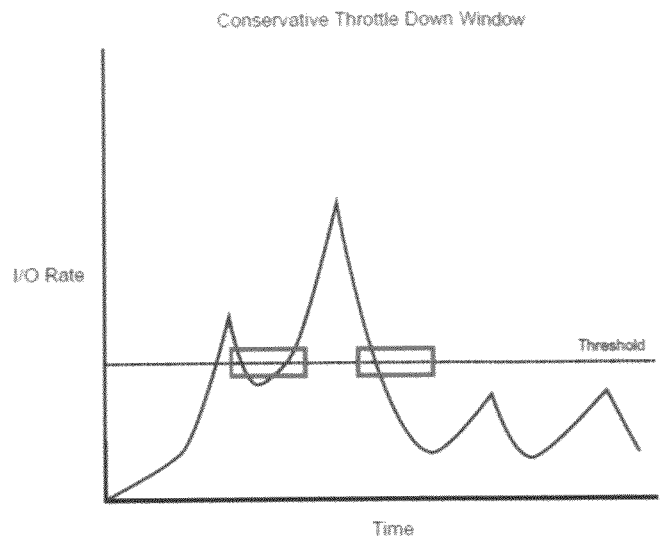
FIG. 5 is a graph illustrating a back off window in a scenario where the data rate increases very quickly.

To understand the back off window, imagine a condition like market open where the data rate from the exchange increases very quickly. This is seen in FIG. 5. As the rate crosses the threshold, the scheduler goes into throttling mode—putting reads on hold. Now imagine that the rate dips momentarily before continuing to go up (this is a common trend in market close and open scenarios). If that dip takes the rate below the threshold, the scheduler will exit throttling mode and allow (potentially a lot of pent up) reads through; however, since the rates are still on a general and very fast upward trend, a lot of reads would have been passed in the middle of high rate writes, risking back pressure and packet drops. The back off window solves this problem by using a historical measure of the rate to predict the current trend, which ignores such dips in an otherwise upward trend. Controlling the size of the window lets the user control how large a dip has to be to signal an actual reversal.

Figure 6:
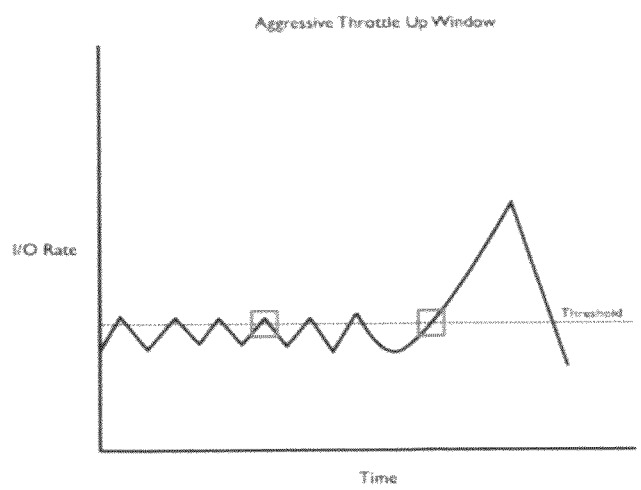
FIG. 6 is a graph illustrating a ramp up window in a scenario where the capture rate is fairly flat and just below the threshold, but somewhat spiky such that the troughs are below the threshold and the peaks are just above the threshold.

To illustrate the ramp up window, imagine a scenario where the capture rate is fairly flat and just below the threshold, but somewhat spiky such that the troughs are below the threshold and the peaks are just above. This is seen in FIG. 6. In this scenario, the scheduler would enter throttling mode at each peak and exit at each through. If the distance between peaks and troughs is small enough, the rate of switching would prevent any meaningful reads from taking place. Using a ramp up window allows the scheduler to differentiate between the situations when the rate is simply oscillating around the threshold and when the rate actually breaks through the threshold.

The ramp up window is smaller than the back off window because the average value of the I/O rate needs to change faster when ramping up as opposed to ramping down where the average I/O rate in the window should reduce slower. That is, the ramp up should throttle aggressively and the ramp down should be more conservative in letting up on the throttle.

Figure 4:
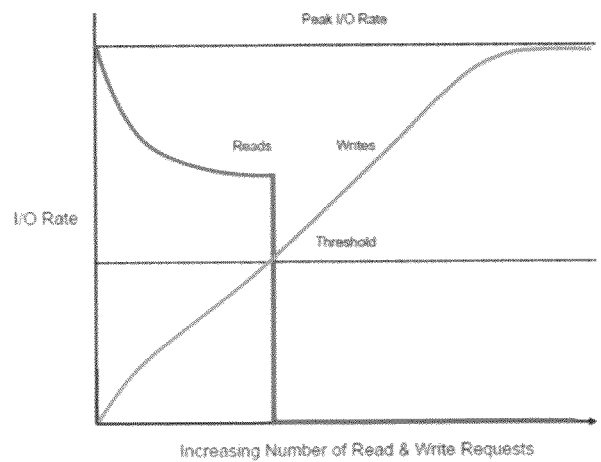
FIG. 4 is a graph illustrating what happens to the read and write rates as capture rate goes up.

Referring to FIG. 4, a chart illustrating what happens to the read and write rates as capture rate goes up utilizing the read-throttling I/O scheduler 113 is seen. When the capture rate as determined over the ramp-up window exceeds the throttling threshold, the read-throttling I/O scheduler 113 ceases to service read requests. Existing and incoming read requests are blocked during this period. During this period, the storage media 105 will operate at peak write performance. When the capture rate as computed over the back-off window drops below the capture threshold, the read-throttling I/O scheduler 113 exits throttling mode and resumes servicing read requests.

Making the back off window short allows the read-throttling I/O scheduler 113 to enter throttling mode quickly if the rate of capture spikes quickly. Similarly making the back off window longer allows the read-throttling I/O scheduler 113 to avoid instances of hysteresis where the rate of capture may dip below the threshold before continuing to climb. By increasing or decreasing the throttling threshold, and the lengths of the ramp up and back off windows, the exact behavior of the read-throttling I/O scheduler 113 can be fine-tuned.

The techniques described herein are not inherently related to any particular hardware or other apparatus. In certain aspects, the techniques described herein may be implemented using hardware or a combination of software and hardware, either in a dedicated server, or integrated into another entity, or distributed across multiple entities.

In addition to hardware, the techniques described herein may be implemented using code that creates an execution environment. Code can constitute processor firmware, a protocol stack, a database management system, an operating system, or a combination of one or more of them stored in memory. The implementation described herein is not limited to any particular programming language.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the techniques described herein should not be understood as requiring such separation in all aspects.

Although the subject matter has been described with a specific implementation, other alternatives, modifications, and variations will be apparent to those skilled in the art. Accordingly, the disclosure is intended to be illustrative, but not limiting, and all such alternatives, modifications, and variations are within the spirit and scope of the following claims.

What is claimed is:

1. One or more computing devices configured to read and write data onto memory, the one or more computing devices comprising:

a read-throttling input/output scheduler configured to take write requests for data captured from a network, provide this data to a system that persists the captured data, and read requests from external user systems;

the read-throttling input/output scheduler further configured to determine a rate for data capture by maintaining two sliding windows over previous write requests;

the read-throttling input/output scheduler further configured such that, when write requests activity exceeds a threshold as determined over one of the two sliding windows, the read-throttling input/output scheduler ceases to service read requests; and a data storage recording element that services the read and write request by retrieving and storing data from and onto a data storage medium.

2. The one or more computing devices of claim 1 further comprising a network communication protocol capture card configured to capture data disseminated over a network and provide this data to the read-throttling input/output scheduler.

3. The one or more computing devices of claim 2 further comprising a passive network tap configured to access data flowing across a network, and to packet and route the data to the network communication protocol capture card.

4. The one or more computing devices of claim 1 wherein the read-throttling input/output scheduler is further configured such that, when write requests activity exceeds the threshold, the read-throttling input/output scheduler ceases to service read requests.

5. The one or more computing devices of claim 4 wherein the second sliding window is longer then the first, and when read and write requests activity exceeds the threshold as determined over the first window, the read-throttling input/output scheduler ceases to service read requests.

6. The one or more computing devices of claim 1 wherein the read-throttling input/output scheduler is further configured such that, when write requests activity exceeds the threshold, the read-throttling input/output scheduler blocks existing and incoming read requests.

7. The one or more computing devices of claim 1 wherein the read-throttling input/output scheduler is further configured such that, when write requests activity drops below the threshold, the read-throttling input/output scheduler resumes servicing read requests.

8. The one or more computing devices of claim 7 wherein the second sliding window is longer then the first, and when read and write requests activity drops below the threshold as computed over the second window, the read-throttling input/output scheduler resumes servicing read requests.

9. The one or more computing devices of claim 1 wherein the read-throttling input/output scheduler is further configured such that, when write performance falls below the rate of data capture, the read-throttling input/output scheduler alters the flow of read requests.

10. The one or more computing devices of claim 1 wherein the threshold is preset.

11. The one or more computing devices of claim 1 wherein the threshold is dynamically determined.

12. The one or more computing devices of claim 1 wherein the storage medium is selected from the group consisting of magnetic disk drives, flash drives, and combinations thereof.

13. The one or more computing devices of claim 1 wherein the storage medium comprises a redundant array of independent disks.

14. A method implemented by one or more computing device configured to read and write data onto memory, the method comprising:

capturing data disseminated over a network;

providing this data to a system which persists the captured data;

determining a rate for data capture by maintaining two sliding windows over previous write requests;

creating read and write requests from the captured data;

forwarding the read and write request to a storage medium; and when write request activity exceeds a threshold as determined over one of the two sliding windows, throttling the flow of read requests; and forwarding the read and write request to a storage medium.

15. The method of claim 14 further comprising when the capture rate exceeds a throttling threshold, ceasing servicing read requests.

16. The method of claim 14 further comprising, when the capture rate exceeds the throttling threshold, blocking existing and incoming read requests.

17. The method of claim 14 further comprising, when the capture rate drops below the capture threshold, resuming servicing read requests.

18. The method of claim 17 further comprising the computing devices connected in a network selected from the group comprising the Internet, personal networks, local area networks, home networks, storage area networks, campus networks, backbone networks, metropolitan area networks, wide area networks, virtual private networks, and combinations thereof.

19. A method implemented by one or more computing devices configured to schedule read and write data onto memory, the method comprising:

receiving read and write requests;

taking write requests for data captured from a network;

providing this data to a system that persists the captured data;

reading requests from external user systems;

determining a rate of read and write requests by maintaining two sliding windows over previous write requests, with the second window being longer than the first;

when write requests activity exceeds the threshold as determined over the first window, throttling the flow of read requests; and forwarding the read and write request to a storage medium.

20. The method of claim 19 further comprising, when write requests activity exceeds the threshold, ceasing servicing read requests.

21. The method of claim 19 further comprising, when write requests activity exceeds the threshold, blocking existing and incoming read requests.

22. The method of claim 19 further comprising, when requests activity drops below the threshold, resuming servicing read requests.

23. The method of claim 19 further comprising, when write performance falls below the rate of data capture, altering the flow of read requests.

* * * * *

UNITED STATES PATENT AND TRADEMARK OFFICE
CERTIFICATE OF CORRECTION

PATENT NO.        : 8,903,994 B2                                              Page 1 of 1
APPLICATION NO.   : 13/506006
DATED             : December 2, 2014
INVENTOR(S)       : Alexander Kramnik, Nicolaus P. Malnick and William Lyle Hayhurst It is certified that error appears in the above-identified patent and that said Letters Patent is hereby corrected as shown below:

On the title page item 75, please delete "Matnick" and insert -- Malnick --.

Signed and Sealed this
Ninth Day of June, 2015

Michelle K. Lee
*Director of the United States Patent and Trademark Office*